United States Patent
Chhabra et al.

(10) Patent No.: US 9,119,025 B1
(45) Date of Patent: *Aug. 25, 2015

(54) METHOD AND APPARATUS FOR MAINTAINING A WIRELESS LOCAL AREA NETWORK CONNECTION DURING A BLUETOOTH INQUIRY PHASE OR A BLUETOOTH PAGING PHASE

(71) Applicant: MARVELL INTERNATIONAL LTD., Hamilton (BM)

(72) Inventors: Kapil Chhabra, Milpitas, CA (US); Zhenyu Zhang, Campbell, CA (US); Milind Kopikare, Cupertino, CA (US); Deepak Jain, San Ramon, CA (US); Gladys Yuen Yan Wong, Fremont, CA (US); Robert Mack, San Jose, CA (US); Li-Fu Jeng, San Jose, CA (US); Ronak Anjan Chokshi, Fremont, CA (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/256,388

(22) Filed: Apr. 18, 2014

Related U.S. Application Data

(63) Continuation of application No. 13/346,690, filed on Jan. 9, 2012, now Pat. No. 8,705,427, which is a continuation of application No. 12/261,009, filed on Oct. 29, 2008, now Pat. No. 8,094,597.

(60) Provisional application No. 60/983,741, filed on Oct. 30, 2007.

(51) Int. Cl.
*H04W 4/00* (2009.01)
*H04W 52/02* (2009.01)

(52) U.S. Cl.
CPC .......... *H04W 4/008* (2013.01); *H04W 52/0261* (2013.01)

(58) Field of Classification Search
CPC ........................ H04W 4/0008; H04W 52/0261
See application file for complete search history.

(56) References Cited

U.S. PATENT DOCUMENTS

| | | | |
|---|---|---|---|
| 6,614,797 B1 | 9/2003 | Hippelainen | |
| 7,215,659 B1 | 5/2007 | Chen et al. | |
| 7,277,692 B1 * | 10/2007 | Jones et al. | ................. 455/412.1 |
| 8,094,597 B1 * | 1/2012 | Chhabra et al. | ................ 370/311 |
| 8,705,427 B1 | 4/2014 | Chhabra et al. | |
| 2002/0136233 A1 | 9/2002 | Chen et al. | |

(Continued)

OTHER PUBLICATIONS

Golmie, N. et al., "Bluetooth and WLAN Coexistence: Challenges and Solutions," IEEE Wireless Comm., vol. 10, No. 6, pp. 22-29, (2003).

(Continued)

*Primary Examiner* — Jianye Wu

(57) ABSTRACT

In response to determining that a Bluetooth inquiry phase or a Bluetooth paging phase is beginning, a power save (PS) mode signal is sent from a first device to a second device via a wireless local area network (WLAN) communication link, wherein the PS mode signal indicates that the first device is in a WLAN PS mode. A PS poll signal is sent from the first device to the second device via the WLAN communication link in a gap between Bluetooth inquiry phase message transmissions during the Bluetooth inquiry phase or between Bluetooth paging phase message transmissions during the Bluetooth paging phase.

28 Claims, 9 Drawing Sheets

(56) References Cited

U.S. PATENT DOCUMENTS

| | | |
|---|---|---|
| 2002/0181492 A1 | 12/2002 | Kasami et al. |
| 2003/0093513 A1 | 5/2003 | Hicks et al. |
| 2005/0059347 A1 | 3/2005 | Haartsen |
| 2008/0279163 A1 | 11/2008 | Desai |

OTHER PUBLICATIONS

Quinnell, Richard A., "WiFi and Bluetooth Fight for Bandwith," EDN, dated Aug. 4, 2005, 4 pages.
Wojtiuk, Jeffrey, "Bluetooth and WiFi Integration: Solving Co-Existence Challenges," RF Design, dated Oct. 2004, 4 pages.
"WiFiTM and BluetoothTM—Interference Issues," HP, dated Jan. 2002, 6 pages.
"How 802.11b/g Wireless WLAN and Bluetooth Can Play; Without Standards-Based Solutions, ICs Must Referee Spectrum Rivalry," Philips Electronics, dated Sep. 2005, 5 pages.
IEEE Std P802.11-REVma/06.0 (Revision of IEEE Std 802.11-1999), "Draft Standard for Information Technology—Telecommunications and information exchange between systems—Local and metropolitan area network—Specific requirements Part 11: Wireless LAN Medium Access Control (MAC) and Physical Layer (PHY) specifications," *Institute for Electrical and Electronics Engineers*, 2006.
Non-Final Office Action for U.S. Appl. No. 12/260,867 mailed Jul. 3, 2013.
Non-Final Office Action for U.S. Appl. No. 12/260,867 mailed Aug. 9, 2012.
Non-Final Office Action for U.S. Appl. No. 12/260,867 mailed Sep. 7, 2011.
Final Office Action for U.S. Appl. No. 12/260,867 mailed Mar. 4, 2013.
Final Office Action for U.S. Appl. No. 12/260,867 mailed Mar. 12, 2012.
Non-Final Office Action for U.S. Appl. No. 12/260,875 mailed Jun. 4, 2013.
Non-Final Office Action for U.S. Appl. No. 12/260,875 mailed Sep. 15, 2011.
Final Office Action for U.S. Appl. No. 12/260,875 mailed Mar. 29, 2012.
Non-Final Office Action for U.S. Appl. No. 12/260,995 mailed Jul. 3, 2013.
Non-Final Office Action for U.S. Appl. No. 12/260,995 mailed Aug. 31, 2012.
Non-Final Office Action for U.S. Appl. No. 12/260,995 mailed Sep. 15, 2011.
Final Office Action for U.S. Appl. No. 12/260,995 mailed Mar. 5, 2013.
Final Office Action for U.S. Appl. No. 12/260,995 mailed Mar. 1, 2012.
Final Office Action for U.S. Appl. No. 12/260,875 mailed Oct. 22, 2013.
IEEE Std P802.11-REVma/06.0, (Revision of IEEE Std 802.11-1999) "Unapproved Draft Standard for Information Technology—Telecommunications and information exchange between systems—Local and metropolitan area network—Specific requirements Part 11: Wireless LAN Medium Access Control (MAC) and Physical Layer (PHY) specifications," (This document reflects the combining of the 2003 Edition of 802.11 plus the 802.11 g, 802.11 h, 802.11 i and 802.11j Amendments) (Superseded by P802.11-REVma_D7.0), pp. 1-1212 (2006).
IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, pp. 1-1184 (Jun. 12, 2007).
IEEE P802.11n™/D3.00, "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, pp. 1-544 (Sep. 2007).
Chen, "Home Network Basis: Transmission Environments and Wired/Wireless Protocols," *Prentice Hall*, pp. 1-26 (Jul. 2003).
van Nee, et al. "The 802.11n MIMO-OFDM Standard for Wireless LAN and Beyond," Wireless Personal Communications, vol. 37, pp. 445-453 (Jun. 2006).
Final Office Action in U.S. Appl. No. 12/260,867, dated Feb. 3, 2014 (24 pages).
Examiner's Answer to Appeal Brief in U.S. Appl. No. 12/260,875, dated Aug. 6, 2014 (18 pages).
Examiner's Answer to Appeal Brief in U.S. Appl. No. 12/260,995, dated Nov. 4, 2014 (19 pages).
Examiner's Answer to Appeal Brief in U.S. Appl. No. 12/260,867, dated Nov. 5, 2014 (19 pages).
Specification of the Bluetooth System, Version 2.0: vol. 0, "Master Table of Contents & Compliance Requirements," pp. 1-74; vol. 1, "Architecture & Terminology Overview," pp. 1-92; vol. 2, "Core System Package [Controller Volume]", pp. 1-814; vol. 4, "Core System Package [Host Volume]," pp. 1-250, (Nov. 4, 2004).

\* cited by examiner

METHOD AND APPARATUS FOR MAINTAINING A WIRELESS LOCAL AREA NETWORK CONNECTION DURING A BLUETOOTH INQUIRY PHASE OR A BLUETOOTH PAGING PHASE

CROSS-REFERENCES TO RELATED APPLICATIONS

This is a continuation of U.S. application Ser. No. 13/346,690 entitled "METHOD AND APPARATUS FOR MAINTAINING A WIRELESS LOCAL AREA NETWORK CONNECTION DURING A BLUETOOTH INQUIRY PHASE OR A BLUETOOTH PAGING PHASE" and filed on Jan. 9, 2012, which is a continuation of U.S. application Ser. No. 12/261,009, now U.S. Pat. No. 8,094,597, entitled "METHOD AND APPARATUS FOR MAINTAINING A WIRELESS LOCAL AREA NETWORK CONNECTION DURING A BLUETOOTH INQUIRY PHASE OR A BLUETOOTH PAGING PHASE" and filed on Oct. 29, 2008, which claims the benefit of U.S. Provisional Application No. 60/983,741, entitled "Coexistence by Puncturing the Bluetooth Inquiry Phase" and filed on Oct. 30, 2007. The disclosures of the above-referenced applications are hereby incorporated by reference herein.

FIELD OF THE TECHNOLOGY

The present disclosure relates generally to communication systems, and more particularly, to wireless communication systems that employ first and second wireless communication networks.

DESCRIPTION OF THE RELATED ART

Wireless communication networks continue to increase in demand as consumers flock toward mobile computing devices and as manufacturers continue to develop wireless devices with greater capabilities and features. Many consumers use personal wireless networks in their homes. While these networks are easy to install and provide considerable bandwidth, they do not provide communication over a very large distance. Many cities have begun arranging wireless networks on a larger scale to provide wireless communication over a larger area.

Numerous types of wireless networks and network protocols exist. Wireless local area networks (WLAN) typically include one of the various Institute of Electrical and Electronics Engineers (IEEE) 802.11 standard wireless protocols, first promulgated in 1999. These protocols include IEEE 802.11a, 802.11b, 802.11g, and 802.11n, which operate at different spectrum bands and/or different multiplexing or spread spectrum schemes to deliver various bit rates to devices on a wireless network. Any of these IEEE 802.11 networks may be referred to as a "WiFi" network.

Another example of a wireless network technology is the Bluetooth wireless protocol promulgated by the Bluetooth Special Interest Group, Inc. Sometimes referred to as personal area networks or PAN, networks employing the Bluetooth wireless protocol employ short-range communications technology facilitating data transmission over short distances from fixed and/or mobile devices. Bluetooth networks also employ frequency hopping spread spectrum, and may achieve a gross data rate of 1 megabit per second (Mb/s) (with Bluetooth version 1.2). Bluetooth networks provide a way to connect and exchange information between devices such as mobile phones, telephones, laptops, personal computers, printers, GPS receivers, digital cameras, video game consoles, peripherals, etc.

Bluetooth and WiFi networks may both operate on the same frequency range (or overlapping frequency ranges), but they employ different modulation techniques. Bluetooth may be useful when transferring information between two or more devices that are near each other in low-bandwidth situations. For example, Bluetooth is commonly used to transfer sound data between a mobile phone and a Bluetooth-enabled wireless headset, or to transfer data between two proximately located hand-held devices (e.g., transferring files). On the other hand, WiFi provides capabilities similar to a traditional Ethernet network and provides much higher data rates as compared with Bluetooth. Also, because WiFi uses higher power than Bluetooth, WiFi communications can occur over greater distances than with Bluetooth.

Frequently, WLAN communication systems and Bluetooth communication systems coexist in sufficiently close proximity to one another that transmissions of one system may interrupt, degrade, or otherwise interfere with transmissions of the other system. For example, when a Bluetooth transmitter is located in close proximity to a WLAN receiver, transmit power emanating from the Bluetooth transmitter may desensitize and possibly saturate the WLAN receiver such that, during the Bluetooth transmission, a data packet being sent to the WLAN receiver by a WLAN access point, for example, either may not be received properly by the WLAN receiver or may even not be received at all. While this problem would not arise if WLAN data were transmitted only when the Bluetooth transmitter was off, in practice it is likely that WLAN and Bluetooth communication systems will overlap in time and interfere with one another to some degree.

For example, a Bluetooth/WLAN compatible communication device may be operating such that Bluetooth communications are in a Bluetooth Inquiry phase and WLAN communications are occurring with an Access Point (AP). The Bluetooth Inquiry phase can last as much as 10 seconds. During this period, if the AP does not receive a WLAN transmission from the computing device, the AP may either disassociate with the computing device or the transmission rate utilized by the AP for transmitting WLAN packets to the computing device may be dropped to a very low rate. This may result in the WLAN throughput going down to nearly zero.

In a Bluetooth network, a Bluetooth-enabled device may seek to discover what other Bluetooth-enabled devices are nearby. This may be accomplished by a Bluetooth inquiry procedure. In the inquiry procedure, the Bluetooth-enabled device broadcasts a series of inquiry messages. Each other Bluetooth-enabled device that receives one or more of the inquiry messages may respond by transmitting back to the Bluetooth-enabled device an inquiry reply message, which includes the address of the responding device. Based on the inquiry reply messages that it receives, the Bluetooth-enabled device can determine what other Bluetooth-enabled devices are nearby. Then, the Bluetooth-enabled device may seek to establish a connection with a selected one of the responding devices by transmitting a series of page messages to the selected responding device. In response, the selected device then transmits a page response message back to the Bluetooth-enabled device. Subsequently, additional information may be exchanged between the two devices to permit a Bluetooth connection to be established.

SUMMARY

In one embodiment, a method includes determining that a Bluetooth inquiry phase or a Bluetooth paging phase is beginning. The method also includes sending, via a wireless local area network (WLAN) communication link, a power save (PS) mode signal from a first device to a second device in response to determining that the Bluetooth inquiry phase or the Bluetooth paging phase is beginning. The PS mode signal indicates that the first device is in a WLAN PS mode. The method additionally includes sending, via the WLAN communication link, a PS poll signal from the first device to the second device in a gap between Bluetooth inquiry phase message transmissions during the Bluetooth inquiry phase or between Bluetooth paging phase message transmissions during the Bluetooth paging phase.

The gap referred to herein between Bluetooth inquiry phase or paging phase message transmissions may be preconfigured within the Bluetooth inquiry phase or paging phase, such as by suppressing a portion of the Bluetooth paging or inquiry transmission, or, alternatively, the gap may be created to accommodate a received WLAN PS mode signal, such as by providing a portion of the Bluetooth paging or inquiry transmission with a relatively low priority and providing a WLAN PS mode signal with a relatively high priority such that the WLAN PS mode signal will effectively take the place of that portion of the Bluetooth inquiry or paging transmission according to an arbitration process.

In another embodiment, an apparatus comprises a power save (PS) mode signal generator configured to cause a PS mode signal to be sent from a first device to a second device via a wireless local area network (WLAN) communication link in response to determining that a Bluetooth inquiry phase or a Bluetooth paging phase is beginning. The PS mode signal indicates that the first device is in a WLAN PS mode. Additionally, the apparatus comprises a timing device to generate an enable signal during a gap between Bluetooth inquiry phase message transmissions during the Bluetooth inquiry phase or between Bluetooth paging phase message transmissions during the Bluetooth paging phase. The apparatus also comprises a PS poll signal generator coupled to the timing device. The PS poll signal generator is configured to cause a PS poll signal to be sent from the first device to the second device via the WLAN communication link in the gap between Bluetooth inquiry phase message transmissions during the Bluetooth inquiry phase or between Bluetooth paging phase message transmissions during the Bluetooth paging phase based on the enable signal.

In yet another embodiment, an apparatus comprises a means for causing a power save (PS) mode signal to be sent from a first device to a second device via a wireless local area network (WLAN) communication link in response to determining that a Bluetooth inquiry phase or a Bluetooth paging phase is beginning. The PS mode signal indicates that the first device is in a WLAN PS mode. The apparatus additionally comprises a means for causing a PS poll signal to be sent from the first device to the second device via the WLAN communication link in a gap between Bluetooth inquiry phase message transmissions during the Bluetooth inquiry phase or between Bluetooth paging phase message transmissions during the Bluetooth paging phase.

DETAILED DESCRIPTIONS

Figure 1:
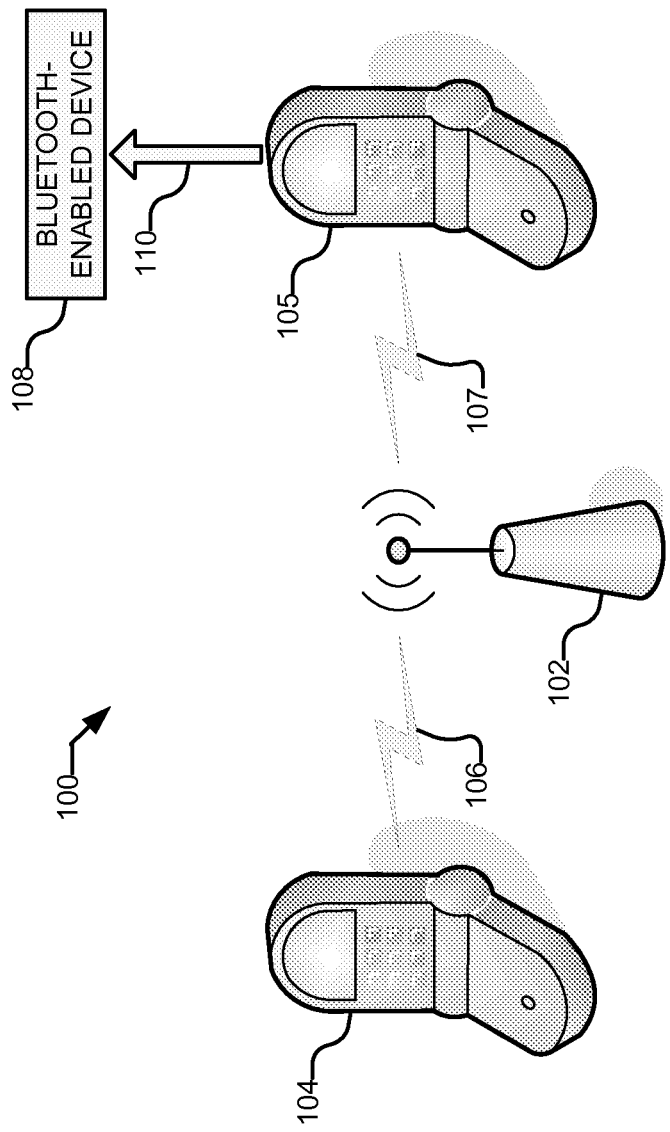
FIG. 1 is a block diagram of an example communication system in which WLAN and Bluetooth communications coexist.

FIG. 1 is a block diagram of an example wireless communication system 100 in which WLAN transmissions and Bluetooth transmissions may coexist. The system 100 includes a WLAN access point 102 which may be coupled with a plurality of wireless stations 104, 105 for WLAN communications between the access point and each of the wireless stations 104, 105. Each of the wireless stations 104, 105 and the access point 102 may communicate according to one or more of the Institute of Electrical and Electronics Engineering (IEEE) 802.11 Standards, for example, or any other desired WLAN protocol, as indicated by the WLAN communication signals 106, 107.

As shown in FIG. 1, the wireless station 105 is Bluetooth-enabled. In other words, in addition to receiving WLAN data packets from the access point 102 of the wireless local area network 100, the wireless station 105 also is capable of connecting to and communicating with a headset or any other suitable Bluetooth-enabled device 108 via a Bluetooth connection 110. In order to establish the Bluetooth connection 110, the wireless station 105 may utilize the Bluetooth inquiry and paging procedures discussed above. During these procedures, the wireless station 105 may transmit a series of messages (e.g., inquiry and paging messages). These messages are typically transmitted in succession, with relatively small time periods in between messages. Thus, if the device 105 were to receive a WLAN packet from the AP 102 during a Bluetooth inquiry phase or during a Bluetooth paging phase, the WLAN packet likely would not be received correctly because of interference caused by the transmission of Bluetooth inquiry or paging messages. On the other hand, in example implementations to be described in more detail below, a Bluetooth interface of the wireless station 105 may be configured to include one or more gaps between Bluetooth inquiry messages and/or between Bluetooth paging messages. In these implementations, a WLAN interface is configured to inform the AP 102 that device 105 is operating in a power save (PS) mode (sometimes referred to as a power management (PM) mode) during the Bluetooth inquiry phase and/or during the Bluetooth paging phase. Then, the WLAN interface may send PS poll signals to the AP 102 during gaps between Bluetooth inquiry messages and/or gaps between Bluetooth paging messages, which causes the AP 102 to send packets during the gaps between Bluetooth inquiry messages and/or the gaps between Bluetooth paging messages in response to the PS poll signals. Thus, interference between a received WLAN packet and Bluetooth inquiry messages and/or Bluetooth paging messages may be avoided. As described above, rather than configuring the wireless station 105 to include gaps by suppressing Bluetooth transmissions, coexistence may be enabled by according a lower priority to certain of the Bluetooth transmissions than the priority accorded to the WLAN PS poll signals so that the latter signals can be transmitted when the Bluetooth transmissions would otherwise be transmitted. An arbitrator can determine whether a Bluetooth inquiry or paging message should be transmitted, or if a WLAN PS poll signal should be transmitted based on priorities associated with the Bluetooth inquiry or paging message and the WLAN PS poll signal.

The relative placement of gaps in the Bluetooth inquiry or paging message (i.e., the puncturing pattern) may be designed judiciously in an effort to minimize the reduction in the probability of a successful synchronization for the inquiry or paging process. A so-called "odd" interval of puncturing will distribute the suppressed packets (or potentially suppressed packets if suppression based on priorities is utilized) relatively evenly among the selected RF channels, because the inquiry/paging process has a repetition of 16 channels, and an odd number interval will ensure suppression on a different channel through every repetition until a packet in each of the 16 channels has been dropped once. At that point, the puncturing pattern will have looped back to the beginning. A longer interval between gaps will lower the degradation of Bluetooth service caused by the gaps. A shorter interval will make more bandwidth available to the WLAN system. The puncturing pattern may drop or suppress consecutive packets, provided that the number of consecutive packets dropped/suppressed is less than the interval and the interval is odd.

Figure 2:
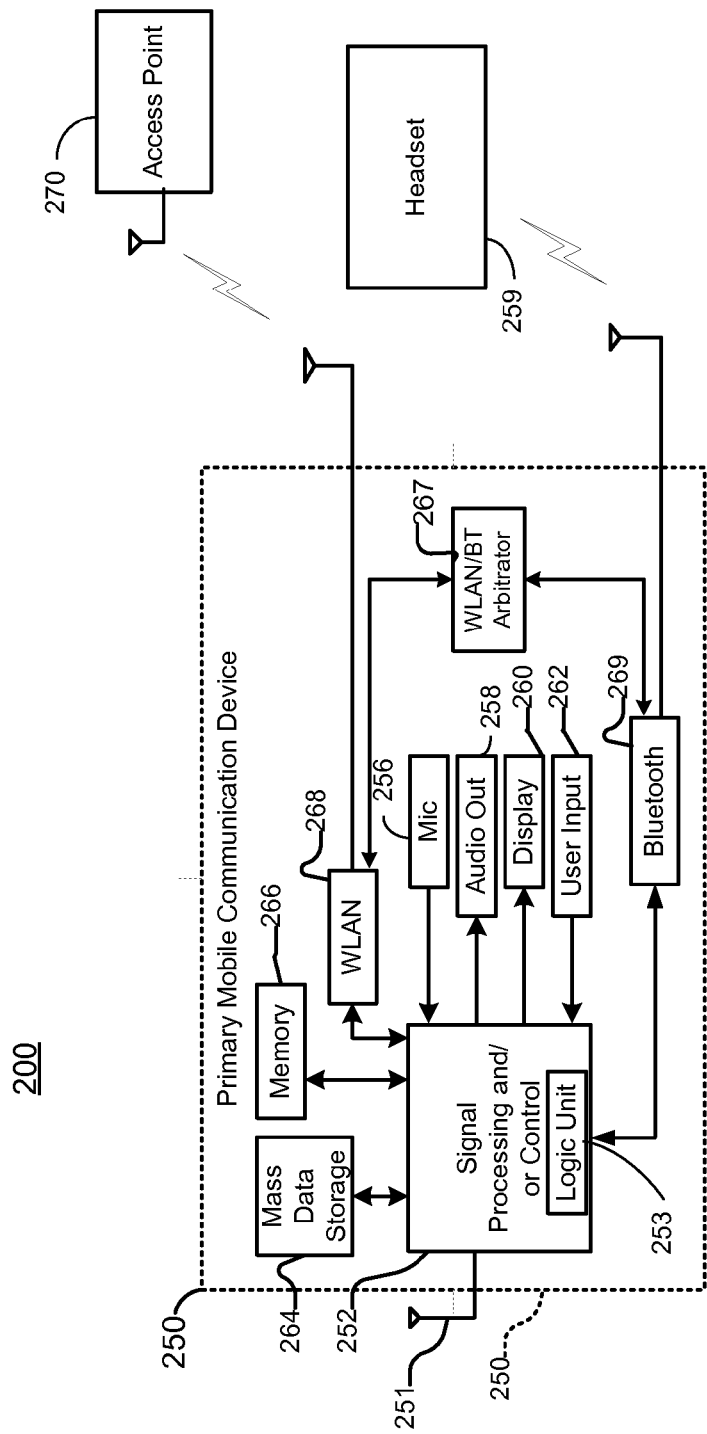
FIG. 2 is a block diagram of a system including a mobile communication device communicating with a Bluetooth compatible device and an Access Point (AP)

FIG. 2 is a block diagram illustrating an exemplary system 200 including a mobile communication device 250 interacting with a Bluetooth-compatible headset 259 and an access point 270. Referring to FIG. 2 in conjunction with FIG. 1, the first mobile communication device 250 may include a cellular antenna 251 and either or both signal processing and/or control circuits 252. The mobile communication device 250 may also include a WLAN network interface 268, and a Bluetooth interface 269. The WLAN network interface 268 may include, or be coupled to, a WLAN control block (not shown). The Bluetooth interface 269 may include, or be coupled to, a Bluetooth control block (not shown). The WLAN control block and the Bluetooth control block may be coupled together. Optionally, the WLAN control block and/or the Bluetooth control block may be included in the signal processing and/or control block 252. In some implementations, the mobile communication device 250 includes a microphone 256, an audio output 258 such as a speaker and/or audio output jack, a display 260 and/or an input device 262 such as a keypad, pointing device, voice actuation and/or other input device. Secondary devices 259 and 270, for example, a hands-free headset unit and AP respectively, may communicate with the device 250. The signal processing and/or control circuits 252 may also process data, perform coding and/or encryption, perform calculations, format data and/or perform other mobile phone functions.

The mobile communication device 250 may include a mass data storage 264 that stores data in a nonvolatile manner such as optical and/or magnetic storage devices, for example, hard disk drives HDD and/or DVDs. The mobile communication device 250 may include a memory 266 such as RAM, ROM, low latency nonvolatile memory such as flash memory and/or other suitable electronic data storage. The mobile communication device 250 also may support connections with a wireless network via the WLAN interface 268. The Bluetooth control block may be configured to cause the Bluetooth interface 269 to include one or more gaps between Bluetooth inquiry messages and/or to include one or more gaps between Bluetooth paging messages that are transmitted by the device 250. The WLAN control block may be configured to cause the device 250 to transmit a signal to the AP 270 to inform the AP 270 that the device 250 is in the PS mode during the Bluetooth inquiry phase and/or during the Bluetooth paging phase. Then, the WLAN control block may cause the device 250 to send PS poll signals to the AP 270 during gaps between Bluetooth inquiry messages and/or gaps between Bluetooth paging messages, which in turn causes the AP 270 to send packets in response to the PS poll signals during the gaps between Bluetooth inquiry messages and/or the gaps between Bluetooth paging messages. Thus, interference between a received WLAN packet and Bluetooth inquiry messages and/or Bluetooth paging messages may be avoided. In some embodiments, a WLAN/Bluetooth arbitrator 267 may be coupled to the WLAN interface 268 and the Bluetooth interface 269 as shown in FIG. 2 to arbitrate which interface is permitted to communicate at any given time based on a priority value assigned to the communication of each interface. For example, the WLAN/Bluetooth arbitrator 267 may grant one of the WLAN interface 268 or the Bluetooth interface 269 the ability to transmit in a particular interval based on priorities of the transmissions. Additionally or alternatively, if a single antenna (not shown) is employed instead of the two antennae illustrated in FIG. 2, the WLAN/Bluetooth arbitrator 267 also may be configured to operate a switch that controls, based on priorities, whether the WLAN interface 268 or the Bluetooth interface 269 is coupled to the single antenna.

Figure 3:
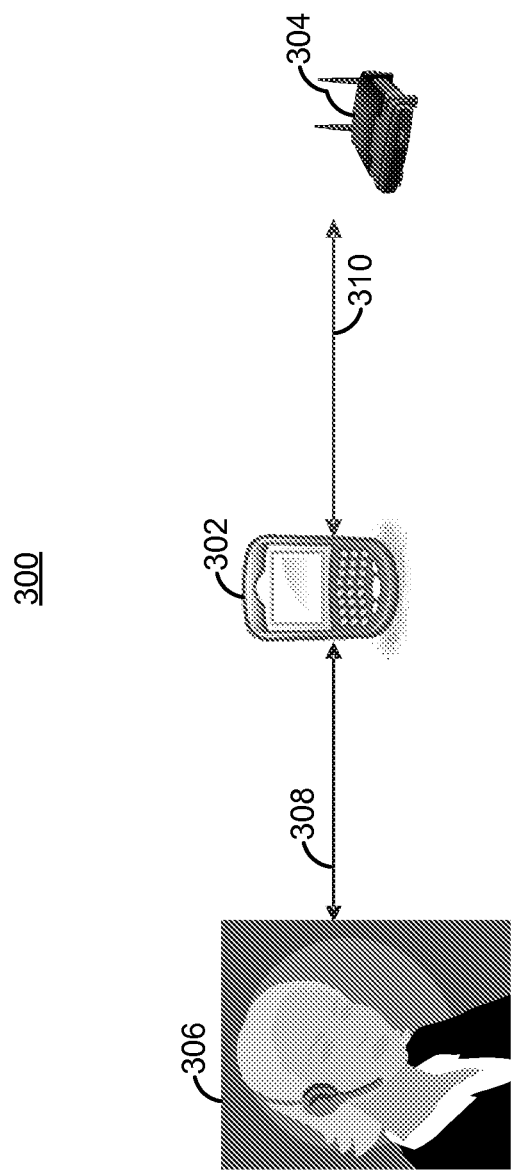
FIG. 3 is a diagram of a communication system including a mobile communication device communicating with a headset device via a Bluetooth connection and communicating with an access point (AP) over a WLAN connection.

FIG. 3 is a block diagram of another example wireless network 300, which may represent a short-range or long-range network and which may include an ad hoc topology and/or infrastructure topology with a first communication device 302 (shown as a handheld communication device) wirelessly communicating with secondary communication devices 304 (shown as an AP) and 306 (depicted as a Bluetooth-ready headset worn by a user). In the illustrated example, the first communication device 302 may be a Portable digital assistant (PDA), a cellular phone, a component of a vehicle, a media player, a laptop computer, a wireless supported desktop computer, a gaming system, a wireless networking device such as a router, a switch, etc., or any other computing device. Similarly, the secondary communication devices 304 and 306 may be any of a variety of computing devices, such as described above with respect to the first communication device 302. In a WLAN environment, the first communication device 302 and the secondary communication devices 304 and 306 may be compliant with one of the accepted or contemplated WLAN communication protocols, of which IEEE 802.11a, 802.11b, 802.11g, 802.11n, are examples. The communication devices 302 and 306 also may be compliant with the Bluetooth (BT) communication protocol. But these communication protocols are provided only by way of example. The mobile communication devices 302, 304, 306 may operate under other wireless communication protocols as desired.

The first communication device 302 may wirelessly communicate with the two secondary communication devices 304 and 306. For instance, communication between the device 302 and the device 304 may be achieved using the WLAN connection 310. Additionally, the device 302 may seek to establish a Bluetooth connection 308 with the device 306. A Bluetooth interface of the first device 302 may be configured to include one or more gaps between Bluetooth inquiry messages and/or to include one or more gaps between Bluetooth paging messages. In these implementations, a WLAN interface of the first device 302 is configured to inform the secondary device 304 that the device 302 is operating in the PS mode during the Bluetooth inquiry phase and/or during the Bluetooth paging phase. Then, the WLAN interface may send PS poll signals to the device 304 during gaps between Bluetooth inquiry messages and/or gaps between Bluetooth paging messages, which causes the device 304 to send packets during the gaps between Bluetooth inquiry messages and/or the gaps between Bluetooth paging messages in response to the PS poll signals. Thus, interference between a received WLAN packet and Bluetooth inquiry messages and/or Bluetooth paging messages may be avoided.

Figure 4:
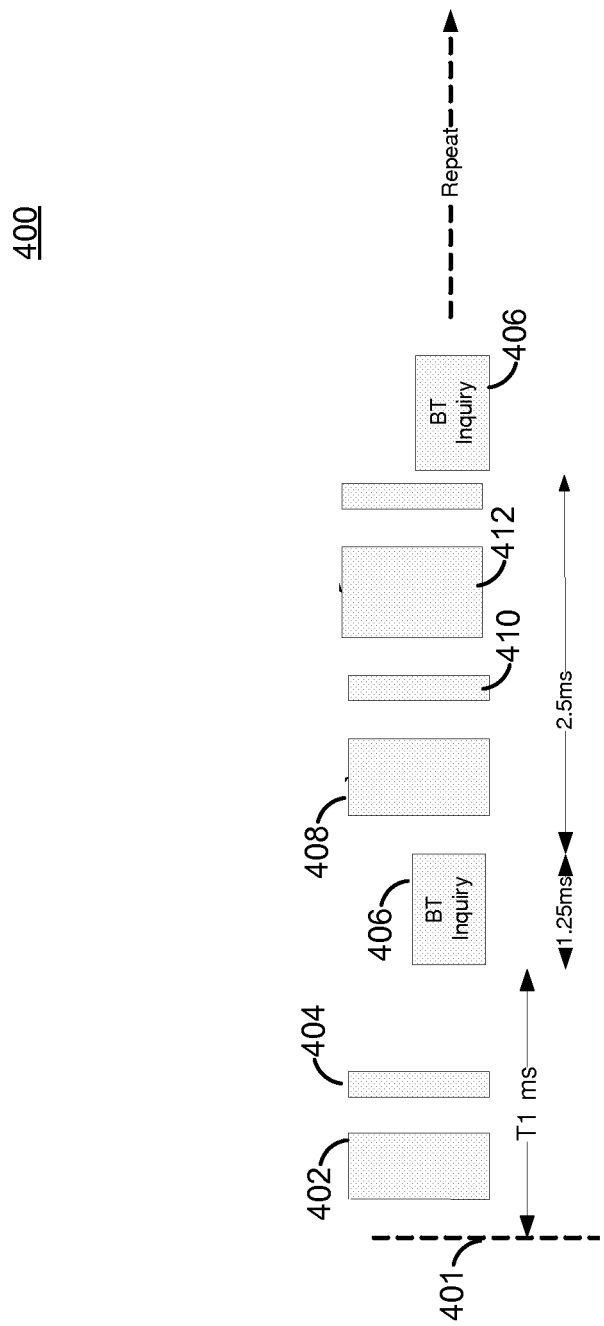
FIG. 4 is a timing diagram illustrating an example process in which WLAN communications occur during a Bluetooth inquiry phase.

FIG. 4 is timing diagram 400 illustrating an example process by which WLAN communications and Bluetooth communications may coexist. FIG. 4 will be described with reference to FIG. 2 for ease of explanation. It is to be understood, however, that the described techniques may be applied to other situations in which a device is communicating on both a WLAN connection and a Bluetooth connection. In the example process of FIG. 4, a time-sharing scheme is generally utilized. For example, Bluetooth inquiry messages and/or Bluetooth paging messages may be spaced apart so that WLAN transmissions may occur in between the Bluetooth transmissions.

FIG. 4 will be described in the context of a discovery process such as the Bluetooth inquiry phase, but those skilled in the art will readily appreciate that the described process also may be applied during a synchronization process such as the Bluetooth paging phase. The Bluetooth inquiry phase may have a duration of any suitable time such as, for example, 10 seconds. During the Bluetooth inquiry phase, the device 250 may transmit a plurality of inquiry messages 406. The duration of each Bluetooth inquiry message 406 may be 68 µs (microseconds), for example. Additionally, the Bluetooth control block (or the Bluetooth WLAN arbitrator 267 where provided) may be configured to cause gaps to be included between at least some of the Bluetooth inquiry messages 406. For example, in FIG. 4, there is a gap between two Bluetooth inquiry message transmissions 406 of 2.5 ms. Other gap lengths may also be utilized. For instance, the Bluetooth standard permits gaps of up to four Bluetooth inquiry message lengths (i.e., 625 µs per Bluetooth inquiry message× 4=2.5 ms) between Bluetooth inquiry messages. Additionally, in FIG. 4, the inquiry message transmissions 406 include two consecutive Bluetooth inquiry messages, thus each inquiry message transmission 406 has a length of 1.25 ms (i.e., 625 µs per Bluetooth inquiry message×2=1.25 ms). Of course, inquiry message transmissions 406 may have different lengths such as a length of one Bluetooth inquiry message or a length of three, four, five, etc., Bluetooth inquiry messages.

When the Bluetooth interface 269 is to begin operating in an inquiry phase, the Bluetooth control block may send a signal (at a time indicated by dashed line 401) such as an interrupt signal to the WLAN control block to inform the WLAN control block that a Bluetooth inquiry phase will soon begin. The Bluetooth control block may be configured to send the signal at a time T1 prior to when the inquiry phase is to begin. The time T1 may be preconfigured and known ahead of time by both the Bluetooth control block and the WLAN control block. Alternatively, the Bluetooth control block may inform the WLAN control block of the time T1 via the signal indicating the Bluetooth inquiry phase will soon begin or another signal, for example. After receiving the signal from the Bluetooth control block indicating that the Bluetooth inquiry phase will soon begin, the WLAN control block may cause the WLAN interface 268 to send a signal 402 to the access point 270 indicating that the device 250 is in a power save mode. The signal 402 may be a packet, such as a null packet, indicating the communication device 250 is going into the PS mode. For example, the packet 402 may include a PS bit set to a value to indicate that the communication device 250 is going into the PS mode. The AP 270 may send an acknowledgment packet 404 in response to the signal 402. The AP 270 may interpret the PS signal in the null packet 402 to mean that the AP 270 can transmit packets (besides acknowledgment packets) to the communication device 250 via the WLAN link only in response PS poll signals sent by the device 250.

Also upon receiving the signal from the Bluetooth control block indicating that the Bluetooth inquiry phase will soon begin, the WLAN control block may start a timer device included in the WLAN control block. The timer device may be configured to generate a control signal that indicates when the PS poll message can be sent to the AP 270 during the Bluetooth inquiry phase. For instance, if the control signal is active, this may indicate that the PS poll message can be sent to the AP 270, whereas an inactive control signal may indicate that the PS poll message should not be sent. The timer device may be configured to generate a control signal that is active after the time 401 and until some time prior to the beginning of the first Bluetooth inquiry phase transmission 406. For example, if it is known that the first Bluetooth inquiry phase transmission 406 is to occur T1 ms after the time 401, the timer device may be configured to cause the control signal to be active from time 401 until a time T1 ms−DELTA, where DELTA is a time period based on an estimate of time required for the communication device 250 to transmit a packet, such as the PS poll message, to the AP 270, to receive an acknowledgment from the AP 270 in response to the PS poll, and to receive a packet, if one is available, from the access point 270 in response to the PS poll. Optionally, the time DELTA may also take into account the time to send an acknowledgment from the device 250 to the AP 270. Optionally, the WLAN control block may be configured to cause PS poll messages to be sent prior to the first Bluetooth inquiry phase transmission 406 and if the timer device control signal is active. Alternatively, the WLAN control block may be configured to cause only the signal 402 to be sent prior to the first Bluetooth inquiry phase transmission 406. In this implementation, the timer device optionally may be configured to cause the control signal to be inactive from the time 401 to the end of the first Bluetooth inquiry phase transmission 406.

The timer device may be configured to cause the control signal to go active after the end of each Bluetooth inquiry phase transmission 406 (except, optionally, for the last Bluetooth inquiry phase transmission 406 in an inquiry phase) and then go inactive at some desired or pre-determined time before the beginning of the next Bluetooth inquiry phase message transmission 406. In the example of FIG. 4, it is known or expected, for instance, that there is a gap of 2.5 ms between the Bluetooth inquiry phase transmissions 406. Thus, the timer device may be configured to cause the control signal to go active when a Bluetooth inquiry phase transmission 406 ends until a time 2.5 ms−DELTA after the Bluetooth inquiry phase transmission 406.

If the WLAN control block has knowledge of the time period T1, the length of each Bluetooth inquiry phase transmission 406, and the length of the gap between each of the Bluetooth inquiry phase transmissions 406, the timer device may be able to generate the control signal by being informed of the time 401, such as by the signal from the Bluetooth control block indicating that the Bluetooth inquiry phase will soon begin. The time period T1, the length of each Bluetooth inquiry phase transmission 406, and the length of the gap between each of the Bluetooth inquiry phase transmissions 406 may be preconfigured and/or or pre-known by the WLAN control block. Optionally, the Bluetooth control block may send this information to the WLAN control block. In one implementation, the Bluetooth control block may send a signal, such as an interrupt signal, indicating the end of each Bluetooth inquiry transmission 406. The timer device may then utilize the signal indicating the end of each Bluetooth inquiry transmission 406 to generate the timer device control signal.

Between Bluetooth inquiry transmissions 406, the WLAN control block may be configured to cause one or more PS poll signals 408 to be sent to the AP 270 if the control signal from the timer device is active. In response, the AP 270 may transmit an acknowledgment 410, and a packet 412, if a corresponding one is available, to the device 250 in response to each PS poll signal 408.

Optionally, at the end of the Bluetooth inquiry phase, the WLAN control block may cause the WLAN interface 268 to send a signal (not shown in FIG. 4) to the access point 270 indicating that the device 250 is no longer in the PS mode. The signal indicating that the device 250 is no longer in the PS mode may be a packet, such as a null packet, indicating the communication device 250 is going not in the PS mode. For example, the null packet may include a PS bit set to a value to indicate that the communication device 250 is not in the PS mode. The AP 270 may send an acknowledgment packet (not shown in FIG. 4) in response to the signal indicating that the device 250 is no longer in the PS mode. The WLAN control block may determine the end of the Bluetooth inquiry phase in a variety of ways. For example, if the length of the Bluetooth inquiry phase is already known to the WLAN control block, the timer device may generate a signal indicating the end of the inquiry phase. Alternatively, the Bluetooth control block may send a signal such as an interrupt signal to the WLAN control block to inform the WLAN control block that the Bluetooth inquiry phase has ended.

Figure 5:
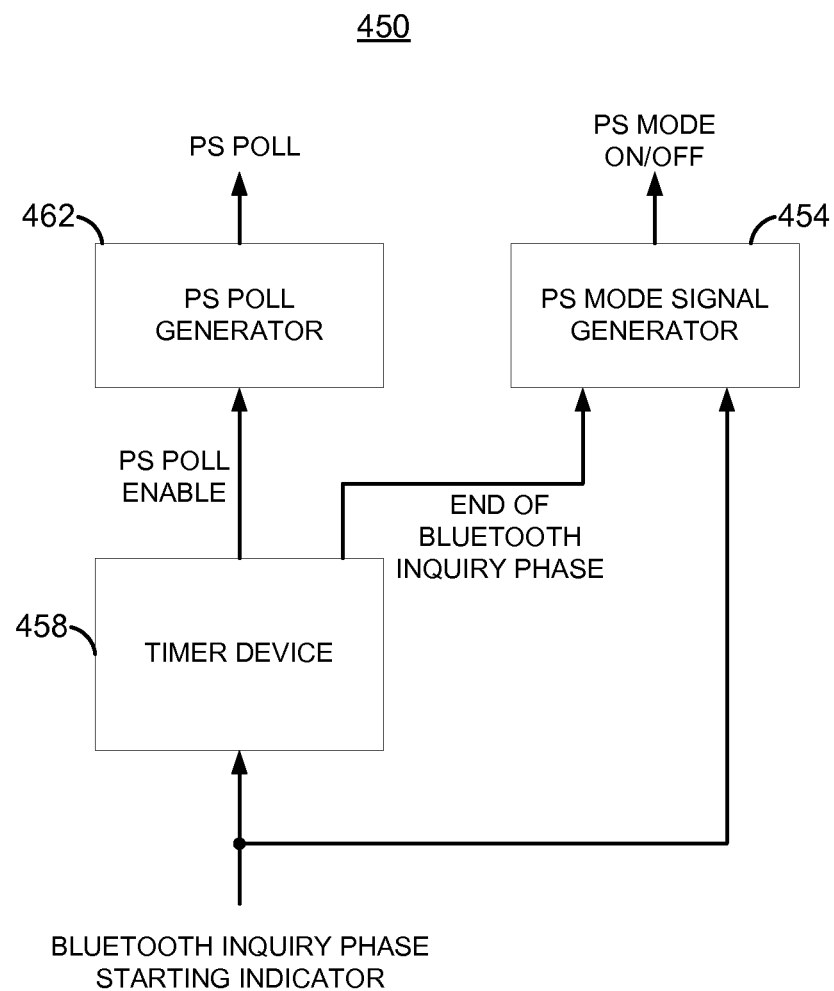
FIG. 5 is a block diagram of an example Bluetooth inquiry phase module for a WLAN control block corresponding to a WLAN interface.

FIG. 5 is a block diagram of an example Bluetooth inquiry phase module 450 for a WLAN control block. For instance, the module 450 may be included in a WLAN control block. The module 450 may be utilized for generating WLAN control signals during a Bluetooth inquiry phase such as in the process discussed above with reference to FIG. 4. Of course, the process discussed above with respect to FIG. 4 may be implemented using a module other than the module 450.

The module 450 may include a PS mode signal generator 454, a timing device 458 and a PS poll message generator 462. The PS mode signal generator 454 generates WLAN signals to be sent to an AP indicating to the AP that the communication device (in which the module 450 is included) is in or out of the PS mode. For example, when the communication device is to begin a Bluetooth inquiry phase, the PS mode signal generator 454 may generate a signal (such as a null packet with a PS parameter or bit set) to be sent to the AP indicating that the communication device is in the PS mode. The PS mode signal generator 454 may generate the signal indicating that the communication device is in the PS mode in response to a signal, such as an interrupt signal, from the Bluetooth control block indicating that a Bluetooth inquiry phase is about to begin. Alternatively, the PS mode signal generator 454 may generate the signal indicating that the communication device is in the PS mode in response to a signal from timing device 458 indicating that a Bluetooth inquiry phase is about to begin.

When the communication device is to leave the Bluetooth inquiry phase, the PS mode signal generator 454 may generate a signal (such as a null packet with a PS parameter or bit cleared) to be sent to the AP indicating that the communication device is out of the PS mode. The PS mode signal generator 454 may generate the signal indicating that the communication device is not in the PS mode in response to a signal from the timing device 458 indicating that the Bluetooth inquiry phase has ended. Alternatively, the PS mode signal generator 454 may generate the signal indicating that the communication device is in the PS mode in response to a signal, such as an interrupt signal, from the Bluetooth control block indicating that the Bluetooth inquiry phase has ended.

The timing device 458 may operate as discussed above with respect to FIG. 4. For example, the timing device 458 may generate a control or enable signal that causes or enables the PS poll message generator 462 to generate PS poll messages in gaps between Bluetooth inquiry message transmissions during the Bluetooth inquiry phase. The timing device 458 may receive the signal from the Bluetooth control block indicating that a Bluetooth inquiry phase is about to begin. The timing device 458 optionally may receive or have access to additional information such as one or more of an indication of the time period T1, an indication of the length of Bluetooth inquiry phase message transmissions, an indication of the length of the gaps between Bluetooth inquiry phase message transmissions, signals indicating when each Bluetooth inquiry phase message transmission begins, a signal indicating when the Bluetooth inquiry phase has ended, etc. The timing device 458 may include one or more timers and control components for controlling the one or more timers. The timer device 458 may include a state machine, for example.

The PS poll message generator 462 may generate PS poll messages in gaps between Bluetooth inquiry message transmissions during the Bluetooth inquiry phase based on the enable signal from the timing device 458.

A module similar to the module 450 could be utilized for controlling WLAN communications during the Bluetooth paging phase. Such a module also may be included in a WLAN control block. Alternatively, the module 450 could be configured to generate WLAN control signals during both the Bluetooth inquiry phase and the Bluetooth paging phase.

Figure 6:
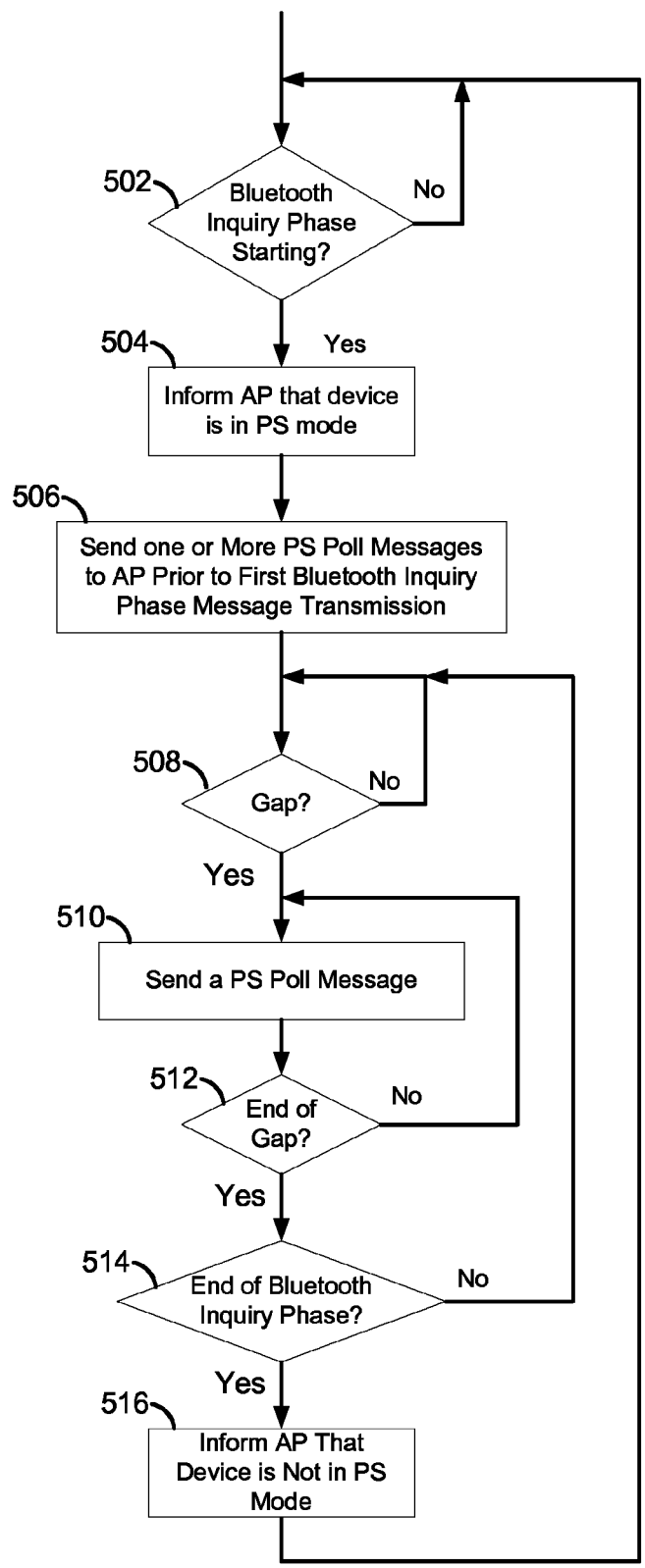
FIG. 6 is a flow diagram of an example method for implementing WLAN communications occur during a Bluetooth inquiry phase.

FIG. 6 is a flow diagram of an example method 500 for controlling WLAN communications during the Bluetooth inquiry phase. The method 500 assumes that the Bluetooth control block has been configured to include one or more gaps between Bluetooth inquiry message transmissions during the Bluetooth inquiry phase. The method 500 may be implemented utilizing a WLAN control block that includes a module such as the example module 450 of FIG. 5. For ease of explanation, the method 500 will be described with reference to FIG. 5. It will be understood, however, that the method 500 may be implemented by a WLAN control block that includes a module other than the module 450.

At a block 502, it is determined whether the Bluetooth inquiry phase is starting. For example, the WLAN control block may receive a signal from the Bluetooth control block indicating that the Bluetooth inquiry phase will soon begin. The signal optionally may indicate when the Bluetooth inquiry phase will begin. As another option, the Bluetooth control block may be configured to send the signal at a time period T1 prior to the Bluetooth inquiry phase beginning, where the time period T1 is known by the WLAN control block. The WLAN control block may determine that the Bluetooth inquiry phase is beginning based on the signal received from the Bluetooth control block. In the example of FIG. 5, the timer device 458 and, optionally, the PS mode signal generator 454 may determine whether the Bluetooth inquiry phase is starting based on the indicator signal from the Bluetooth control block.

At a block 504, the AP may be informed that the device is entering the PS mode. For example, the PS mode signal generator 454 may cause an indication such as, for example, a null packet with a PS mode parameter or bit set, to be sent to the AP in response to the signal from the Bluetooth control block, or a signal from the timer device 458 indicating that the Bluetooth inquiry phase is about to begin.

At an optional block 506, one or more PS poll messages may be sent to the AP prior to a first Bluetooth inquiry message transmission. For instance, if the time period T1 permits, the device may attempt to get one or more packets from the AP prior to the first Bluetooth inquiry message transmission by prompting the AP with one or more PS poll messages. The timer device 458 may be configured to cause the control or enable signal to be active for a time prior to the first Bluetooth inquiry message transmission. Thus, the PS poll message generator 462 may cause one or more PS poll messages to be sent to the AP prior to the first Bluetooth inquiry message transmission. The block 506 may be omitted.

At a block 508, it may be determined if a gap between Bluetooth inquiry phase transmissions has started. For example, the timer device 458 may determine if a gap between Bluetooth inquiry phase transmissions has started. If it is determined that the gap has started, the timer device 458 may cause the enable signal to be active.

At a block 510, a PS poll message may be sent to the AP. For example, the PS poll message generator 462 may cause a PS poll message to be sent to the AP.

Ata block 512, it may be determined if the gap is about to end. For example, it may be determined if a time period DELTA prior to the end of the gap has been reached. The timer device 458 may determine if the gap is about to end. If it is determined that the gap is not about to end, the flow may proceed back to the block 510, at which another PS poll message may be generated. If, however, it is determined that the gap is about to end, the timer device 458 may cause the enable signal to be inactive, and the flow may proceed to a block 514.

At the block 514, it may be determined if the inquiry phase has ended. For example, it may be determined whether the last Bluetooth inquiry message transmission has ended. The timer device 458 may determine if the Bluetooth inquiry phase has ended. If it determined that the Bluetooth inquiry phase has not ended, the flow may proceed to the block 508. On the other hand, if it determined that the Bluetooth inquiry phase has ended, the flow may proceed to a block 516.

At the block 516, the AP may be informed that the device is no longer in PS mode. For example, the timing device 454 may generate a signal indicating that the Bluetooth inquiry phase has ended, and this signal may be provided to the PS mode signal generator 454. Alternatively, the Bluetooth control block may generate the signal indicating that the Bluetooth inquiry phase has ended. In response to the signal indicating that the Bluetooth inquiry phase has ended, the PS mode signal generator 454 may cause a signal, such as a null packet with a PS mode bit or parameter cleared, to be sent to the AP to inform the AP that the device is no longer in the PS mode.

A method similar to the method 500 could be utilized for controlling WLAN communications during the Bluetooth paging phase. Such a method may be implemented utilizing a WLAN control block.

Figure 7A:
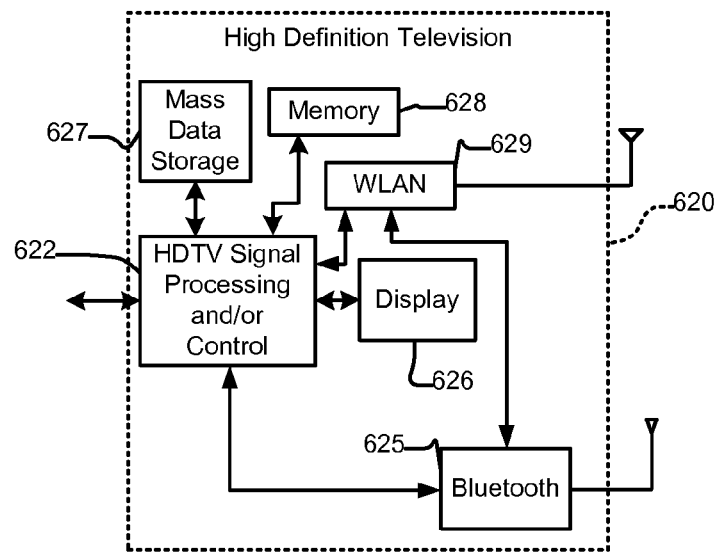
FIGS. 7A-7E are various examples of devices that may utilize techniques such as described herein for implementing WLAN communications during a Bluetooth inquiry phase or during a Bluetooth paging phase.

Techniques such as described above for maintaining WLAN communications during a Bluetooth inquiry phase and/or during a Bluetooth paging phase may be utilized in a variety of devices that have both WLAN and Bluetooth capabilities. Referring now to FIGS. 7A-7E, various example devices are shown that may utilize such techniques. Referring to FIG. 7A, such techniques may be utilized in a high definition television (HDTV) 620. The HDTV 620 includes signal processing and/or control circuits, which are generally identified in FIG. 7A at 622, and a mass data storage 627. HDTV 620 receives HDTV input signals in either a wired or wireless format and generates HDTV output signals for a display 626. In some implementations, signal processing circuit and/or control circuit 622 and/or other circuits (not shown) of HDTV 620 may process data, perform coding and/or encryption, perform calculations, format data and/or perform any other type of HDTV processing that may be required.

HDTV 620 may communicate with mass data storage 627 that stores data in a nonvolatile manner such as optical and/or magnetic storage devices. The mass data storage 627 may include one or more hard disk drives (HDDs) and/or one or more digital versatile disks (DVDs). One or more of the HDDs may be a mini HDD that includes one or more platters having a diameter that is smaller than approximately 1.8". HDTV 620 may be connected to memory 628 such as RAM, ROM, low-latency nonvolatile memory such as flash memory and/or other suitable electronic data storage. HDTV 620 also may support wireless connections with a WLAN via a WLAN network interface 629. HDTV 620 also may support wireless connections with Bluetooth enabled devices via a Bluetooth interface 625. The WLAN network interface 629 may include, or be coupled to, a WLAN control block (not shown). The Bluetooth interface 625 may include, or be coupled to, a Bluetooth control block (not shown). The WLAN control block and the Bluetooth control block may be coupled together. Optionally, the WLAN control block and/or the Bluetooth control block may be included in the signal processing and/or control block 622. The HDTV 620 may utilize techniques such as described above to either maintain a connection between a HDTV 620 and an access point or enable the access point to send WLAN packets to the HDTV 620 during a Bluetooth inquiry phase and/or a Bluetooth paging phase, for example.

Figure 7B:
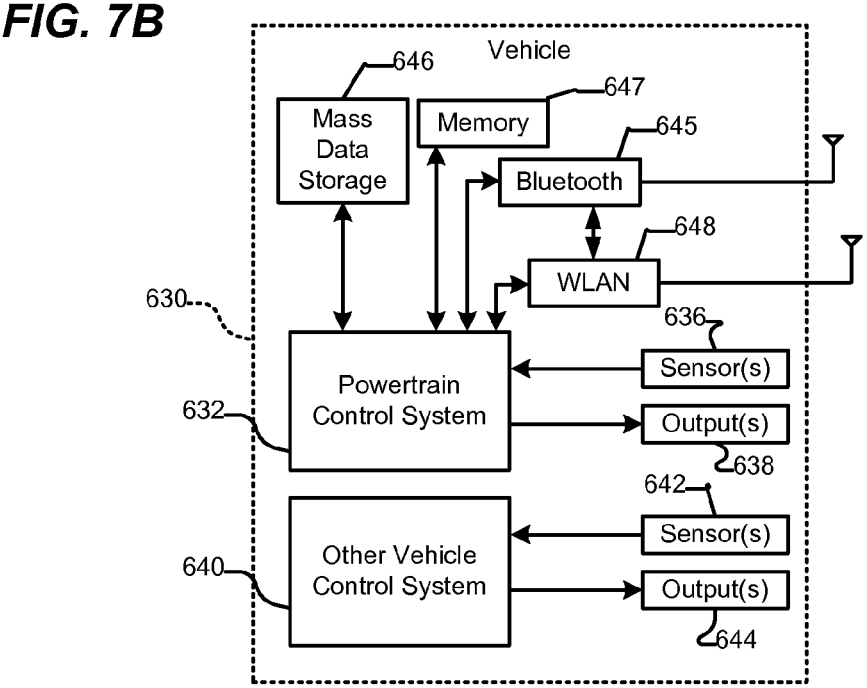

Referring now to FIG. 7B, techniques such as described above may be utilized in a control system of a vehicle 630. In some implementations, a powertrain control system 632 receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

A control system 640 may likewise receive signals from input sensors 642 and/or output control signals to one or more output devices 644. In some implementations, control system 640 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 632 may communicate with mass data storage 646 that stores data in a nonvolatile manner. Mass data storage 646 may include optical and/or magnetic storage devices for example hard disk drives HDD and/or DVDs. One or more of the HDDs may be a mini HDD that includes one or more platters having a diameter that is smaller than approximately 1.8". Powertrain control system 632 may be connected to memory 647 such as RAM, ROM, low-latency nonvolatile memory such as flash memory and/or other suitable electronic data storage. Powertrain control system 632 and/or control system 640 also may support wireless connections with a WLAN via a WLAN network interface 648. Powertrain control system 632 and/or control system 640 also may support wireless connections to Bluetooth enabled devices via a Bluetooth interface 645. The WLAN network interface 648 may include, or be coupled to, a WLAN control block (not shown). The Bluetooth interface 645 may include, or be coupled to, a Bluetooth control block (not shown). The WLAN control block and the Bluetooth control block may be coupled together. Optionally, the WLAN control block and/or the Bluetooth control block may be included in Powertrain control system 632 and/or control system 640. The vehicle 630 may utilize techniques such as described above to either maintain a connection between a vehicle and an access point or enable the access point to send WLAN packets to the vehicle during a Bluetooth inquiry phase and/or during a Bluetooth paging phase, for example.

Figure 7C:
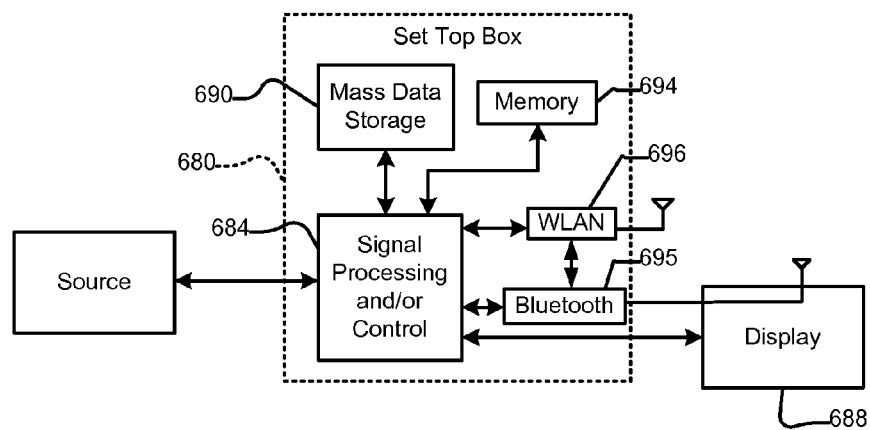

Referring now to FIG. 7C, techniques such as described above may be utilized in a set top box 680. The set top box 680 includes signal processing and/or control circuits, which are generally identified in FIG. 7C at 684, and a mass data storage device 690. Set top box 680 receives signals from a source such as a broadband source and outputs standard and/or high-definition audio/video signals suitable for a display 688 such as a television and/or monitor and/or other video and/or audio output devices. Signal processing and/or control circuits 684 and/or other circuits (not shown) of the set top box 680 may process data, perform coding and/or encryption, perform calculations, format data and/or perform any other set top box function.

Set top box 680 may communicate with mass data storage 690 that stores data in a nonvolatile manner. Mass data storage 690 may include optical and/or magnetic storage devices for example hard disk drives HDD and/or DVDs. At least one HDD may be a mini HDD that includes one or more platters having a diameter that is smaller than approximately 1.8". Set top box 680 may be connected to memory 694 such as RAM, ROM, low-latency nonvolatile memory such as flash memory and/or other suitable electronic data storage. Set top box 680 also may support wireless connections with a WLAN via the WLAN network interface 696. Set top box 680 also may support wireless connections to Bluetooth enabled devices via a Bluetooth interface 695. The WLAN network interface 696 may include, or be coupled to, a WLAN control block (not shown). The Bluetooth interface 695 may include, or be coupled to, a Bluetooth control block (not shown). The WLAN control block and the Bluetooth control block may be coupled together. Optionally, the WLAN control block and/or the Bluetooth control block may be included in signal processing/control block 684. Set top box 680 may utilize techniques such as described above to either maintain a connection between the Set top box 680 and an access point or enable the access point to send WLAN packets to the Set top box 680 during a Bluetooth inquiry phase and/or during a Bluetooth paging phase.

Figure 7D:
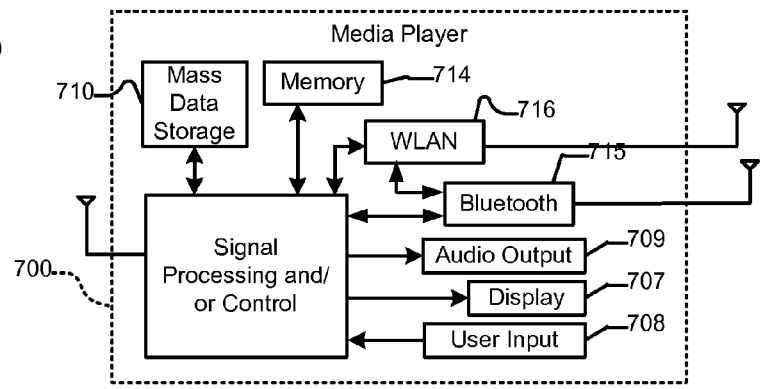

Referring now to FIG. 7D, techniques such as described above may be utilized in a media player 700. The media player 700 may include signal processing and/or control circuits, which are generally identified in FIG. 7D at 704, and a mass data storage device 710. In some implementations, media player 700 includes a display 707 and/or a user input 708 such as a keypad, touchpad and the like. In some implementations, media player 700 may employ a graphical user interface (GUI) that typically employs menus, drop down menus, icons and/or a point-and-click interface via display 707 and/or user input 708. Media player 700 further includes an audio output 709 such as a speaker and/or audio output jack. Signal processing and/or control circuits 704 and/or other circuits (not shown) of media player 700 may process data, perform coding and/or encryption, perform calculations, format data and/or perform any other media player function.

Media player 700 may communicate with mass data storage 710 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may be a mini HDD that includes one or more platters having a diameter that is smaller than approximately 1.8". Media player 700 may be connected to memory 714 such as RAM, ROM, low-latency nonvolatile memory such as flash memory and/or other suitable electronic data storage. Media player 700 also may support wireless connections with a WLAN via a WLAN network interface 716. Media player 700 also may support wireless connections to Bluetooth enabled devices via a Bluetooth interface 715. The WLAN network interface 716 may include, or be coupled to, a WLAN control block (not shown). The Bluetooth interface 715 may include, or be coupled to, a Bluetooth control block (not shown). The WLAN control block and the Bluetooth control block may be coupled together. Optionally, the WLAN control block and/or the Bluetooth control block may be included in signal processing/control block 704. Media player 700 may utilize techniques such as described above to either maintain a connection between a media player 700 and an access point or enable the access point to send WLAN packets to the media player 700 during a Bluetooth inquiry phase and/or a Bluetooth paging phase, for example.

Figure 7E:
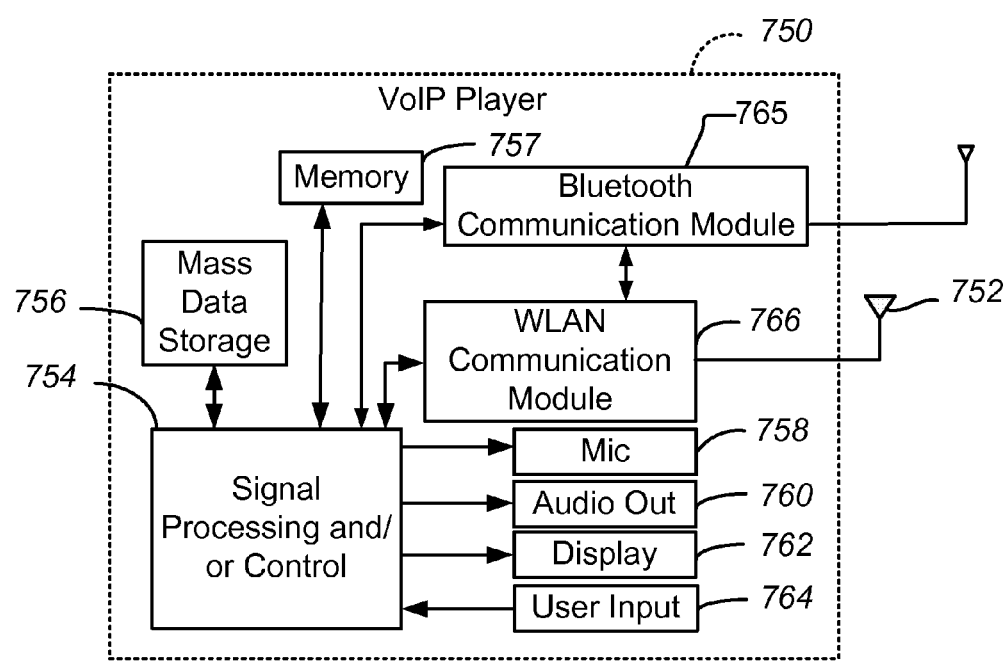

Referring to FIG. 7E, techniques such as described above may be utilized in a Voice over Internet Protocol (VoIP) phone 750 that may include an antenna 752, signal processing and/or control circuits 754, and a mass data storage 756. In some implementations, VoIP phone 750 includes, in part, a microphone 758, an audio output 760 such as a speaker and/or audio output jack, a display monitor 762, an input device 764 such as a keypad, pointing device, voice actuation and/or other input devices, and a WLAN interface 766. Signal processing and/or control circuits 754 and/or other circuits (not shown) in VoIP phone 750 may process data, perform coding and/or encryption, perform calculations, format data and/or perform other VoIP phone functions.

VoIP phone 750 may communicate with mass data storage 756 that stores data in a nonvolatile manner such as optical and/or magnetic storage devices, for example hard disk drives HDD and/or DVDs. The HDD may be a mini HDD that includes one or more platters having a diameter that is smaller than approximately 1.8". VoIP phone 750 may be connected to memory 757, which may be a RAM, ROM, low-latency nonvolatile memory such as flash memory and/or other suitable electronic data storage. VoIP phone 750 is configured to establish communications link with a VoIP network (not shown) via WLAN interface 766. VoIP phone 750 also may support wireless connections to Bluetooth enabled devices via a Bluetooth interface 765. The WLAN interface 766 may include, or be coupled to, a WLAN control block (not shown). The Bluetooth interface 765 may include, or be coupled to, a Bluetooth control block (not shown). The WLAN control block and the Bluetooth control block may be coupled together. Optionally, the WLAN control block and/or the Bluetooth control block may be included in signal processing/control block 754. VoIP phone 750 may utilize techniques such as described above to either maintain a connection between a VoIP phone 750 and an access point or enable the access point to send WLAN packets to the VoIP phone 750 during a Bluetooth inquiry phase and/or during a Bluetooth paging phase, for example.

In each of the embodiments of FIGS. 7A-7E, a WLAN/Bluetooth arbitrator may be coupled to the WLAN interface and the Bluetooth interface, as described above in relation to FIG. 2, to arbitrate which one of the interfaces is permitted to communicate at any given time based on a priority value assigned to the communication of each interface. Also, a single antenna may be employed instead of two antennae, and the WLAN/Bluetooth arbitrator may be configured to operate a switch that controls whether the WLAN interface or the Bluetooth interface is coupled to the single antenna.

The various blocks, operations, and techniques described above may be implemented in hardware, firmware, software, or any combination of hardware, firmware, and/or software. When implemented in software, the software may be stored in any computer readable memory such as on a magnetic disk, an optical disk, or other storage medium, in a RAM or ROM or flash memory of a computer, processor, hard disk drive, optical disk drive, tape drive, etc. Likewise, the software may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software may be delivered to a user or a system via a communication channel such as a telephone line, a DSL line, a cable television line, a wireless communication channel, the Internet, etc. (which are viewed as being the same as or interchangeable with providing such software via a transportable storage medium). When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, it will be apparent to those of ordinary skill in the art that changes, additions or deletions in addition to those explicitly described above may be made to the disclosed embodiments without departing from the spirit and scope of the invention.

What is claimed is:

1. A method comprising:
   determining that a Bluetooth inquiry phase or a Bluetooth paging phase is beginning;
   in response to determining that the Bluetooth inquiry phase or the Bluetooth paging phase is beginning, sending, via a wireless local area network (WLAN) communication link, a power save indicator signal from a first device to a second device, wherein the power save indicator signal indicates that the first device is in a WLAN power save mode; and
   sending, via the WLAN communication link, a first power save poll signal from the first device to the second device prior to a start of the Bluetooth inquiry phase or the Bluetooth paging phase to prompt the second device to transmit a first WLAN packet to the first device prior to the start.

2. The method of claim 1, wherein sending the first power save poll signal comprises causing a power save enable signal to be active from a time of the determination that the Bluetooth inquiry phase or a Bluetooth paging phase is beginning until a time DELTA before the start of the Bluetooth inquiry phase or the Bluetooth paging phase, where DELTA is a time period based on an estimate of time required for i) transmission of the first power save poll signal, ii) receipt of an acknowledgment from the second device in response to the power save poll signal, and iii) receipt of the first WLAN packet, if one is available, from the second device in response to the first power save poll signal.

3. The method of claim 1, further comprising sending, via the WLAN communication link, one or more additional first power save poll signals from the first device to the second device prior to the start of the Bluetooth inquiry phase or the Bluetooth paging phase to prompt the second device to transmit one or more additional first WLAN packets to the first device prior to the start.

4. The method of claim 1, further comprising sending, via the WLAN communication link, a second power save poll signal from the first device to the second device during a gap between Bluetooth inquiry phase message transmissions during the Bluetooth inquiry phase or between Bluetooth paging phase message transmissions during the Bluetooth paging phase to prompt the second device to transmit a second WLAN packet to the first device during the gap.

5. The method of claim 4, wherein determining that the Bluetooth inquiry phase or the Bluetooth paging phase is beginning comprises receiving an indication from a Bluetooth hardware device that the Bluetooth inquiry phase or the Bluetooth paging phase is beginning.

6. The method of claim 5, wherein:
   the indication from the Bluetooth hardware device indicates that the Bluetooth inquiry phase or the Bluetooth paging phase will begin at a determined time T1 after the indication from the Bluetooth hardware device is received; and
   sending the first power save poll signal comprises causing a power save enable signal to be active from a time of the determination that the Bluetooth inquiry phase or a Bluetooth paging phase is beginning until a time T1–DELTA, where DELTA is a time period based on an estimate of time required for i) transmission of the first power save poll signal, ii) receipt of an acknowledgment from the second device in response to the power save poll signal, and iii) receipt of the first WLAN packet, if one is available, from the second device in response to the first power save poll signal.

7. The method of claim 4, further comprising determining timing of the gap based on the indication from the Bluetooth hardware device.

8. The method of claim 7, further comprising receiving, from a Bluetooth hardware device, an indication indicating when the gap begins, wherein determining timing of the gap is based on the indication.

9. The method of claim 4, further comprising sending, via the WLAN communication link, one or more additional second power save poll signals from the first device to the second device during one or more corresponding additional gaps between Bluetooth inquiry phase message transmissions during the Bluetooth inquiry phase or between Bluetooth paging phase message transmissions during the Bluetooth paging phase to prompt the second device to transmit one or more additional second WLAN packets to the first device during the additional gaps.

10. The method of claim 1, further comprising:
determining that the Bluetooth inquiry phase or the Bluetooth paging phase ended; and
in response to determining that the Bluetooth inquiry phase or the Bluetooth paging phase ended, sending, via the WLAN communication link, a second signal from the first device to the second device, wherein the second signal indicates that the first device is no longer in the WLAN power save mode.

11. The method of claim 1, wherein the power save indicator signal includes a packet having a bit set to indicate that the first device is in the WLAN power save mode.

12. The method of claim 11, wherein the packet is a null packet.

13. An apparatus, comprising:
a power save (PS) mode signal generator to cause a first PS mode signal to be sent from a first device to a second device via a wireless local area network (WLAN) communication link in response to determining that a Bluetooth inquiry phase or a Bluetooth paging phase is beginning, wherein the first PS mode signal indicates that the first device is in a WLAN PS mode;
a timing device to generate an enable signal to be active from a time of the determination that the Bluetooth inquiry phase or a Bluetooth paging phase is beginning until a time DELTA before a start of the Bluetooth inquiry phase or the Bluetooth paging phase, where DELTA is a time period based on an estimate of time required for i) transmission of the first power save poll signal, ii) receipt of an acknowledgment from the second device in response to the power save poll signal, and iii) receipt of the first WLAN packet, if one is available, from the second device in response to the first power save poll signal; and
a PS poll signal generator coupled to the timing device, the PS poll signal generator configured to cause a first PS poll signal to be sent from the first device to the second device via the WLAN communication link prior to the start of the Bluetooth inquiry phase or the Bluetooth paging phase to prompt the second device to transmit a first WLAN packet to the first device prior to the start based on the enable signal.

14. The apparatus of claim 13, wherein the timing device is configured to generate the enable signal based on a received indication that the Bluetooth inquiry phase or the Bluetooth paging phase is beginning.

15. The apparatus of claim 13, further comprising a Bluetooth control block configured to generate the received indication that the Bluetooth inquiry phase or the Bluetooth paging phase is beginning.

16. The apparatus of claim 13, wherein the PS poll signal generator is configured to cause one or more additional first power save poll signals to be sent from the first device to the second device prior to the start of the Bluetooth inquiry phase or the Bluetooth paging phase to prompt the second device to transmit one or more additional first WLAN packets to the first device prior to the start.

17. The apparatus of claim 13, wherein:
the Bluetooth control block is configured to cause a gap between Bluetooth inquiry phase message transmissions during the Bluetooth inquiry phase or between Bluetooth paging phase message transmissions during the Bluetooth paging phase based on a puncturing pattern;
the timing device is configured to generate the enable signal during the gap; and
the PS poll signal generator is configured to cause a second PS poll signal to be sent from the first device to the second device via the WLAN communication link during the gap to prompt the second device to transmit a second WLAN packet to the first device during the gap based on the enable signal.

18. The apparatus of claim 17, wherein:
the timing device is configured to generate the enable signal during one or more additional gaps between Bluetooth inquiry phase message transmissions during the Bluetooth inquiry phase or between Bluetooth paging phase message transmissions during the Bluetooth paging phase; and
wherein the PS poll signal generator is configured to cause one or more corresponding additional second PS poll signals to be sent from the first device to the second device via the WLAN communication link in the one or more corresponding additional gaps between Bluetooth inquiry phase message transmissions during the Bluetooth inquiry phase or between Bluetooth paging phase message transmissions during the Bluetooth paging phase to prompt the second device to transmit one or more additional second WLAN packets to the first device during the additional gaps.

19. The apparatus of claim 13, wherein the PS mode signal generator is configured to cause a second PS mode signal to be sent from the first device to the second device via the WLAN communication link in response to an indication that the Bluetooth inquiry phase or the Bluetooth paging phase ended, wherein the second PS mode signal indicates that the first device is not in the WLAN PS mode.

20. The apparatus of claim 13, wherein the PS mode signal generator is configured to cause the first PS mode signal to be sent in a null packet.

21. A tangible, non-transitory computer readable medium storing instructions thereon that, when executed by a processor, cause the processor to:
determine that a Bluetooth inquiry phase or a Bluetooth paging phase is beginning;
in response to determining that the Bluetooth inquiry phase or the Bluetooth paging phase is beginning, cause a wireless local area network (WLAN) interface device of a first communication device to transmit a power save indicator signal to a second communication device, wherein the power save indicator signal indicates that the first communication device is in a WLAN power save mode; and
cause the WLAN interface device to send a first power save poll signal to the second communication device prior to a start of the Bluetooth inquiry phase or the Bluetooth paging phase to prompt the second communication device to transmit a first WLAN packet to the first communication device prior to the start.

22. The tangible, non-transitory computer readable medium of claim 21, further storing instructions thereon that, when executed by a processor, cause the processor to:
cause a power save enable signal to be active from a time of the determination that the Bluetooth inquiry phase or a Bluetooth paging phase is beginning until a time DELTA before the start of the Bluetooth inquiry phase or the Bluetooth paging phase, where DELTA is a time period based on an estimate of time required for i) transmission of the first power save poll signal, ii) receipt of an acknowledgment from the second device in response to the power save poll signal, and iii) receipt of the first WLAN packet, if one is available, from the second device in response to the first power save poll signal.

23. The tangible, non-transitory computer readable medium of claim 21, further storing instructions thereon that, when executed by a processor, cause the processor to:
cause the WLAN interface device to send one or more additional first power save poll signals to the second communication device prior to the start of the Bluetooth inquiry phase or the Bluetooth paging phase to prompt the second communication device to transmit one or more additional first WLAN packets to the first communication device prior to the start.

24. The tangible, non-transitory computer readable medium of claim 21, further storing instructions thereon that, when executed by a processor, cause the processor to:
cause the WLAN interface device to send a second power save poll signal to the second communication device during a gap between Bluetooth inquiry phase message transmissions during the Bluetooth inquiry phase or between Bluetooth paging phase message transmissions during the Bluetooth paging phase to prompt the second communication device to transmit a second WLAN packet to the first communication device during the gap.

25. The tangible, non-transitory computer readable medium of claim 21, further storing instructions thereon that, when executed by a processor, cause the processor to:
cause a power save enable signal to be active from a time of a determination that the Bluetooth inquiry phase or a Bluetooth paging phase is beginning until a time T1−DELTA, wherein
an indication from a Bluetooth hardware device indicates i) that the Bluetooth inquiry phase or the Bluetooth paging phase is beginning, and ii) that the Bluetooth inquiry phase or the Bluetooth paging phase will begin at a determined time T1 after the indication from the Bluetooth hardware device is received, and
DELTA is a time period based on an estimate of time required for i) transmission of the first power save poll signal, ii) receipt of an acknowledgment from the second communication device in response to the power save poll signal, and iii) receipt of the first WLAN packet, if one is available, from the second communication device in response to the first power save poll signal.

26. The tangible, non-transitory computer readable medium of claim 21, further storing instructions thereon that, when executed by a processor, cause the processor to determine timing of the gap based on an indication from a Bluetooth hardware device that the Bluetooth inquiry phase or the Bluetooth paging phase is beginning.

27. The tangible, non-transitory computer readable medium of claim 21, further storing instructions thereon that, when executed by a processor, cause the processor to:
cause the WLAN interface device to send one or more additional second power save poll signals to the second communication device during one or more corresponding additional gaps between Bluetooth inquiry phase message transmissions during the Bluetooth inquiry phase or between Bluetooth paging phase message transmissions during the Bluetooth paging phase to prompt the second communication device to transmit one or more additional second WLAN packets to the first communication device during the additional gaps.

28. The tangible, non-transitory computer readable medium of claim 21, further storing instructions thereon that, when executed by a processor, cause the processor to:
determine that the Bluetooth inquiry phase or the Bluetooth paging phase ended; and
in response to determining that the Bluetooth inquiry phase or the Bluetooth paging phase ended, cause the WLAN interface device to send a second signal to the second communication device, wherein the second signal indicates that the first communication device is no longer in the WLAN power save mode.

* * * * *